US010575676B2

(12) United States Patent
Rubin et al.

(10) Patent No.: US 10,575,676 B2
(45) Date of Patent: Mar. 3, 2020

(54) BREWING MODULE, CAPSULE RECOGNITION MODULE, AND BEVERAGE PREPARATION MACHINE

(71) Applicant: Qbo Coffee GmbH, Wallisellen (CH)

(72) Inventors: Andres Rubin, Bubikon (CH);
Dominic Zwicker, Nesslau (CH);
Pascal Tanner, Schmerikon (CH);
Claudio Foscan, Rapperswil-Jona (CH)

(73) Assignee: QBO COFFEE GMBH, Wallisellen (CH)

( * ) Notice: Subject to any disclaimer, the term of this patent is extended or adjusted under 35 U.S.C. 154(b) by 351 days.

(21) Appl. No.: 15/531,598

(22) PCT Filed: Nov. 17, 2015

(86) PCT No.: PCT/EP2015/076849
§ 371 (c)(1),
(2) Date: May 30, 2017

(87) PCT Pub. No.: WO2016/087192
PCT Pub. Date: Jun. 9, 2016

(65) Prior Publication Data
US 2017/0325626 A1 Nov. 16, 2017

(30) Foreign Application Priority Data

Dec. 1, 2014 (EP) .................................. 14195680

(51) Int. Cl.
*A47J 31/36* (2006.01)
*A47J 31/44* (2006.01)

(52) U.S. Cl.
CPC ....... *A47J 31/4492* (2013.01); *A47J 31/3633* (2013.01); *A47J 31/3638* (2013.01); *A47J 31/3676* (2013.01); *A47J 31/3695* (2013.01)

(58) Field of Classification Search
CPC . A47J 31/4492; A47J 31/3676; A47J 31/3695
(Continued)

(56) References Cited

U.S. PATENT DOCUMENTS 5,191,196 A  3/1993 Mercede et al.
6,878,913 B2 * 4/2005 Lee ...................... H05B 6/6473
219/705
(Continued)

FOREIGN PATENT DOCUMENTS

CN  102789115  11/2012
DE      405080  10/1924
(Continued)

OTHER PUBLICATIONS

English Translation of International Preliminary Report on Patentability dated Jun. 6, 2017 (Jun. 6, 2017), Application No. PCT/EP2015/076849, 6 pages.
(Continued)

*Primary Examiner* — Reginald Alexander
(74) *Attorney, Agent, or Firm* — Rankin, Hill & Clark LLP

(57) ABSTRACT

A capsule recognition module for a brewing module for preparing a brewed beverage from a single serve capsule includes: an optical sensor for sensing optical properties of the capsule that is located in a capsule recognition position, a capsule recognition window that is made of a transparent material and is located between the capsule recognition position and the camera, and a fan for generating an air flow from the capsule recognition window towards the capsule recognition position.

8 Claims, 5 Drawing Sheets

(58) Field of Classification Search
USPC .............................. 99/289 R, 295, 280, 282
See application file for complete search history.

(56) References Cited

U.S. PATENT DOCUMENTS

| | | | |
|---|---|---|---|
| 7,461,584 B2 | 12/2008 | Blanc et al. | |
| 2010/0083841 A1* | 4/2010 | Bergeron | A47J 31/3666 99/280 |
| 2012/0187195 A1 | 7/2012 | Actis et al. | |
| 2013/0129872 A1* | 5/2013 | Kruger | A47J 31/4492 426/115 |
| 2016/0166105 A1* | 6/2016 | Bugnano | B65D 85/8043 426/232 |
| 2016/0309953 A1* | 10/2016 | De Vreede | A47J 31/3623 |

FOREIGN PATENT DOCUMENTS

| | | |
|---|---|---|
| DE | 1 286 921 | 1/1969 |
| DE | 1 914 470 | 10/1970 |
| DE | 40 06 500 | 9/1991 |
| DE | 198 51 379 | 5/2000 |
| DE | 102 33 348 | 1/2004 |
| DE | 10 2007 032 287 | 1/2009 |
| DE | 10 2011 084 278 | 4/2013 |
| EP | 0 316 169 | 5/1989 |
| EP | 1 593 329 | 11/2005 |
| EP | 1 786 303 | 4/2008 |
| EP | 2 253 253 | 11/2010 |
| EP | 2 525 691 | 4/2014 |
| EP | 2 789 919 | 10/2014 |
| GB | 2 449 213 | 11/2008 |
| WO | 2005/079638 | 9/2005 |
| WO | 2007/087890 | 8/2007 |
| WO | 2010/118544 | 10/2010 |
| WO | 2011/104095 | 9/2011 |
| WO | 2012/123440 | 9/2012 |
| WO | 2013/042016 | 3/2013 |
| WO | 2013/110206 | 8/2013 |
| WO | 2014/001516 | 1/2014 |
| WO | 2014/001563 | 1/2014 |
| WO | 2015/039258 | 3/2015 |
| WO | 2015/048914 | 4/2015 |

OTHER PUBLICATIONS

English translation of Chinese Office Action dated Jun. 10, 2019, Application No. 201580064072.5, 7 pages.

* cited by examiner

BREWING MODULE, CAPSULE RECOGNITION MODULE, AND BEVERAGE PREPARATION MACHINE

BACKGROUND OF THE INVENTION

Field of the Invention

The invention relates to extraction appliances for preparing drinks or the like, from an extraction material, for example ground coffee, which is contained in a capsule. In particular, it relates to a brewing module for an extraction appliance, to a capsule recognition module, as well as to a drinks preparation machine with such a brewing module and/or capsule recognition module.

Description of Related Art

Extraction appliances for preparing drinks or the like, from an extraction material, which is present in a portion package, are known for example as coffee machines or espresso machines. In many corresponding systems, the portion packages are designed as capsules, in which the extraction material is sealed, for example, in an airtight manner. For extraction, the capsule is pierced, for example at two sides, which are opposite to one another. An extraction fluid—generally hot water—is introduced at the first side. The extraction product is discharged from the capsule at the second side. This takes place in a so-called brewing module. Such a module includes a brewing chamber, in which the capsule is received. Brewing modules, with which the capsule is inserted and the brewing chamber is closed manually by way of an operating lever or automatically in a motorised manner are particularly popular, wherein the capsule is automatically removed from the brewing chamber and ejected into a capsule container, after the brewing procedure on renewed opening of the brewing chamber. Such brewing modules with an automatic capsule ejection are generally designed as horizontal brewing modules, i.e. the insertion of the capsule is effected from above, the closure of the brewing chamber is a horizontal relative movement of two brewing chamber parts, the brewing fluid flows essentially horizontally and the capsule container is formed below the brewing chamber.

A problem area in this context concerns the detection of capsule characteristics, for example the reading-out of information attached to the capsule, for activating a brewing process in dependence on this information. One possibility as far as this is concerned, is to provide the capsule with a suitable marking or colour combination and to optically detect this. This is effected for example with a camera. However, practical problems arise with such a process carried out in the direct proximity of the brewing chamber. Due to the heat dissipated by the brewing chamber and due to the water vapour and contamination, on the one hand it is desirable to attach a camera as remotely as possible from the brewing chamber and in a manner shielded from this. On the other hand, corresponding shieldings—in the form of windows for example—can render the read-out process itself more difficult, in particular if they become fogged or dirty. The usual measures combatting such fogging or contamination are coatings, which however are only effective to a limited extent in the environment of the brewing chamber.

SUMMARY OF THE INVENTION

It is an object of the invention, to provide a drinks (beverage) preparation machine, which overcomes disadvantages of the state of the art and which, on account of an as simple as possible design, permits the detection of characteristics of an applied portion capsule before the brewing process.

According to the invention, a capsule recognition module for a brewing module for preparing a brewed drink/beverage from a portion capsule is provided, and it comprises:
- an optical sensor, in particular a camera, for detecting optical characteristics of the capsule located at a capsule recognition position,
- a capsule recognition window of a transparent material, between the capsule recognition position and the camera, and
- a fan for producing an airflow at the side of the capsule recognition window which is towards the capsule recognition position.

This is based on the recognition that the reliability of the capsule recognition can be compromised by a fogging of the capsule recognition widow, even with a separation of the brewing chamber on the one hand and the capsule recognition position on the other hand. In particular, it is almost impossible to avoid hot vapours rising upwards and fogging the capsule recognition window after the brewing process has been effected and the brewing chamber has been opened. Such a fogging is efficiently prevented by way of the fan. It has been found that the reliability of the capsule recognition can be significantly improved by way of this measure, which in itself is quite simple.

The fact that the window is of a "transparent" material does not mean that it needs to be completely transparent to the complete visible range of the electromagnetic spectrum. In contrast, it is only a transparency to a part of the electromagnetic spectrum, to which the optical sensor is sensitive and for which sensor the capsule includes an optically readable feature. Thereby, it is particularly light in the visible wavelength region or infrared light region which is considered.

A "fan" here is to be understood as an active fan, i.e. a fan, with which air is moved by way of an active input of energy, in particular an electrically driven fan. In particular, the fan can be designed as a ventilator, which transports air between the region in front of the capsule recognition window and an environment of the drinks preparation machine.

The fan can be activated in a targeted manner, wherein the activation of the fan is effected, for example, such that the fan only runs during a capsule recognition procedure and/or in each case subsequently to a brewing process. A permanent operation in the operationally ready condition of the drinks preparation machine is also possible.

With the capsule recognition module, in particular one can firstly determine whether the inserted capsule is suitable for use in the drinks preparation machine in the first place, or not—and this is known per se. Secondly, there exists the possibility of displaying corresponding information to the user, for example via a display, on the basis of the recognised capsule characteristics. For example, the drink type (coffee, tea, etc.), the sort (e.g. "100% Arabica"), the recommended preparation manner (e.g. "espresso", "ristretto" or "lungo" etc.) and/or other information can be displayed. Thirdly, the program, which is implemented by the coffee machine for the brewing, can be selected on the basis of the recognised capsule sort; for example the brewing pressure, the brewing duration as well as possibly also the temperature and/or other characteristics can be set depending on whether the inserted capsule is envisaged for the preparation of e.g. ristretto, espresso or lungo.

Suitable, optically readable features, for example, are a bar code, a 2D matrix code (for example QR code or Aztec code), a pictogram (icon) and/or a certain colouring. A code according to the European patent applications 14 197 487.3, 14 197 488.1 and/or 14 197 489.9 are also considered.

In embodiments, the capsule recognition window is arranged at a non-right angle to an axis between the capsule recognition position and the optical sensor.

Here, the axis between the capsule recognition position and the optical sensor is to be understood as an axis in the optical sense, i.e. in the case of light deflecting means between the capsule recognition position and the sensor, the axis does not necessarily correspond to a direct connection, but to a beam path of a light beam, which goes along the shortest path, from the middle of a surface of the capsule at the capsule recognition position, the surface being detected by the camera, to the middle of the sensor. If the optical sensor is a camera with camera optics, then the axis can coincide with an optical axis (axis of symmetry) of the camera optics.

The angle of the capsule recognition window to the perpendicular to the axis at the location of its passage through the window is for example at least 10°, in particular at least 15° with such embodiments.

The capsule recognition module moreover includes, for example, at least one light source for illuminating the capsule at the capsule recognition position. Such a light source is preferably arranged behind the capsule recognition window, i.e. at the side of the capsule recognition window, which is towards the optical sensor, in order, as it is also the case with the optical sensor, for it to be protected from vapours and contamination, by way of the capsule recognition window.

Such a light source can, e.g., include an LED or a number of LEDs.

A light diffuser can be present between the light source and the capsule recognition position, for example likewise behind the window, in order to prevent any occurring reflections at the capsule, particularly in cases, in which the capsule surface acts in a slightly reflecting manner.

A light source and a diffuser in particular can be arranged peripherally with respect to the optical sensor and a possible optical axis. The diffuser, for example, can surround a camera optics.

It is particularly in combination with a light source arranged behind the capsule recognition window that the optional procedure with a capsule recognition window at a non-right angle to the axis has the advantage that reflections of the light source at the window are not visible from the location of the optical sensor. The optical sensor can therefore be set very sensitively, since no interfering influences of such reflections are present.

The capsule recognition module can be used as part of a brewing module.

In embodiments, such a brewing module can additionally include the following elements:
  a housing, which includes a capsule insert opening, through which the capsule can be inserted, for example in a defined orientation;
  a first brewing module part and a second brewing module part, which is movable relative to this, wherein a brewing chamber can be formed by the first and the second brewing module part, said brewing chamber at least partly surrounding the capsule located in a brewing position with the brewing procedure, wherein the brewing module is designed to brew a brewed drink by way of the introduction of a brewing fluid into the capsule and to discharge this drink out of the capsule;
  wherein the first and the second brewing module part are movable relative to one another, between three different, defined positions,
  wherein the brewing chamber is formed in the first position,
  wherein a capsule located in the brewing chamber drops downwards into a capsule container under the effect of gravity after a movement from the first into the second position, wherein however in the second position the brewing module parts have the effect that a capsule, which is inserted through the capsule insert opening is held vertically above a height of the brewing position, at the capsule recognition position,
  wherein in the third position, a capsule located at the capsule recognition position can drop downwards from this, essentially down to the height of the brewing position,
  and wherein the second position is between the first position and the third position.

The first position thereby corresponds to the closed condition of the brewing chamber. In the second position, the brewing chamber is open to the bottom, but is quasi closed to the top for the capsule insertion, and only in the third position is it completely open to the bottom and top.

With these embodiments, the position into which the capsule drops from the capsule recognition position when the brewing module parts are in the third position can directly be the brewing position. However, one can also envisage the capsule dropping into an intermediate position, in particular at the vertical height of the brewing position, and not being displaced into the brewing position until this is effected by way of the closure of the brewing chamber, i.e. the transfer of the brewing module parts into the first position.

In these embodiments, the first, second and third position can be mechanically defined by stops and/or by latching positions or the like. The fact that the brewing module parts have the effect that a capsule inserted through the capsule insert opening is stopped vertically above the brewing position at the capsule recognition position, can be accomplished, for example, by way of a rest portion of one of the brewing module parts—in particular of the moved brewing module part. Such a rest portion can block an insertion path downwards from the capsule recognition position to such an extent that the capsule cannot drop further downwards. If, as is known per se, the capsule is guided in its orientation by way of suitable lateral guide means, then this can be effected by a portion of the moved brewing module part, which in the second position projects only slightly into the insertion path. On account of this, the brewing module in particular can be designed such that the rest portion is fixedly connected to the remainder of the brewing module part and, for example, is even as one piece with this, and thus makes do without moving parts between the rest portion and the portions of the brewing module part that co-form the brewing chamber. In embodiments, an element of the one brewing module part, which at the upper side projects towards the other brewing module part, forms the rest portion.

The movement of the brewing module parts relative to one another in particular is a linear movement, i.e. a translation along an axis. On account of the procedure according to the invention, a pivotability of the brewing module parts is not necessary, but neither is it ruled out.

In particular, the brewing module is a horizontal brewing module, and the axis of the movement in particular is an essentially horizontal axis, i.e. it runs parallel to the surface, on which the drinks preparation machine is placed, or roughly parallel to this, for example up to an angle of maximal 20°.

In embodiments, the drive for the movement of the brewing module parts relative to one another in particular is an electrical drive. In these embodiments, as the case may be in the respective embodiments, the first, second and/or third position, which are defined above, in particular the second position, can also be defined electronically, by way of the electrical drive being programmed such that it moves the brewing module parts relative to one another in each case by a predefined movement path. In such embodiments, the activation of the electrical drive, for example, likewise belongs to the brewing module, even if, with regard to its location, it is present at another location of the drinks preparation machine and is integrated, for example, into the activation of the complete machine. The activation of the drive in particular can be programmed such that a moving into the third position is not effected until after a capsule recognition procedure, and that the brewing module parts always move from the first into the second position after the brewing procedure has been effected, unless a capsule recognition procedure with a next capsule has already taken place during the brewing procedure.

In many embodiments, one of the brewing module parts (hereinafter "the stationary brewing module part", for example the discharge device) is assembled in a manner in which it is fixed to the housing, whilst the other brewing module part (hereinafter "the moved brewing module part", for example the injector) is moved with the transition between the positions. The relative movement of the brewing module parts to one another is then therefore effected by way of the movement of only the moved brewing module part.

The invention also relates to a brewing module with a capsule recognition module according to the invention, for example with the aforementioned additional characteristics, as well as to a drinks preparation machine with such a capsule recognition module.

BRIEF DESCRIPTION OF THE DRAWINGS

Embodiment examples of the invention are hereinafter described by way of the figures. In the figures, the same reference numerals describe the same or analogous elements. There are shown in.

DETAILED DESCRIPTION OF THE INVENTION

Figure 1:
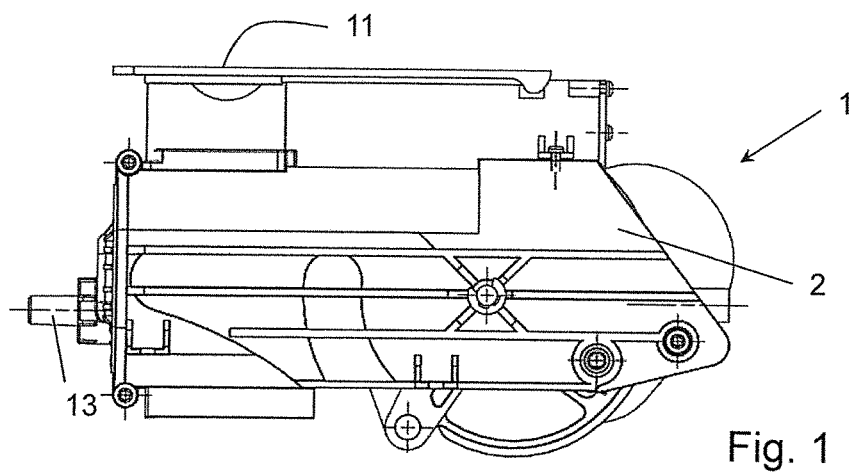
FIG. 1 is a lateral view of the brewing module.
Figure 2:
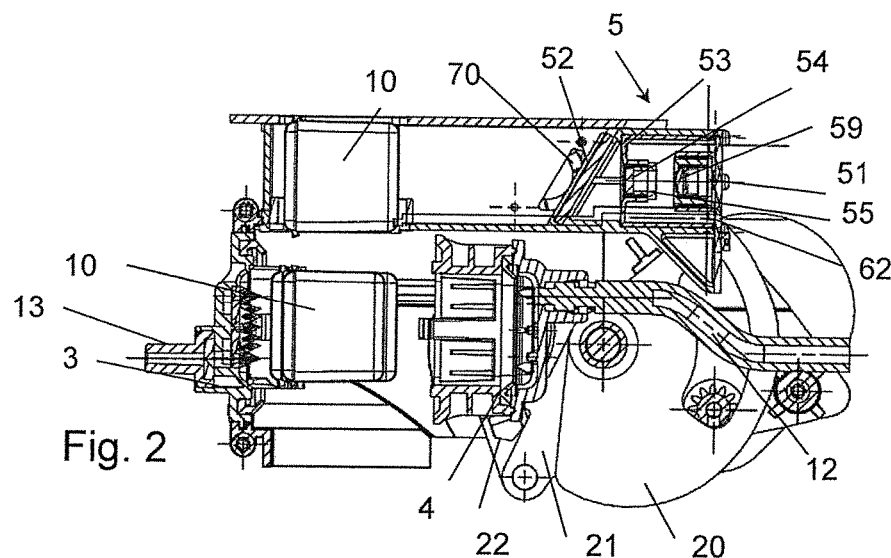
FIG. 2 is a sectioned representation of the brewing module of FIG. 1, sectioned along the plane II-II in FIG. 3.
Figure 3:
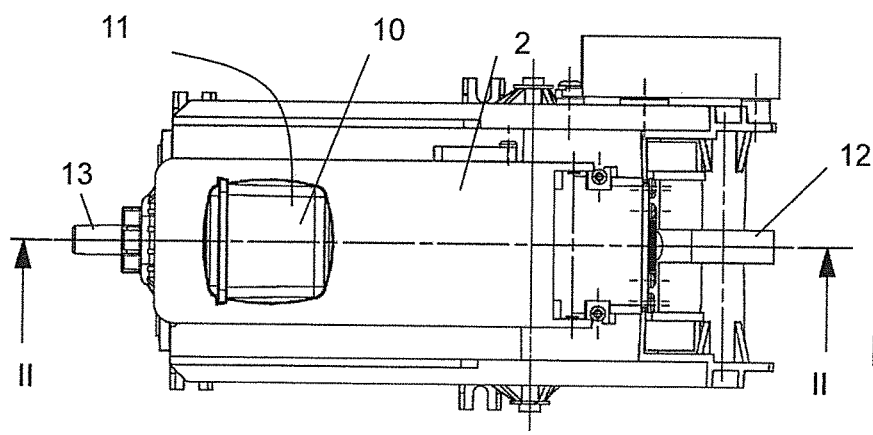
FIG. 3 is a view of the brewing module of FIG. 1, from above.
Figure 4:
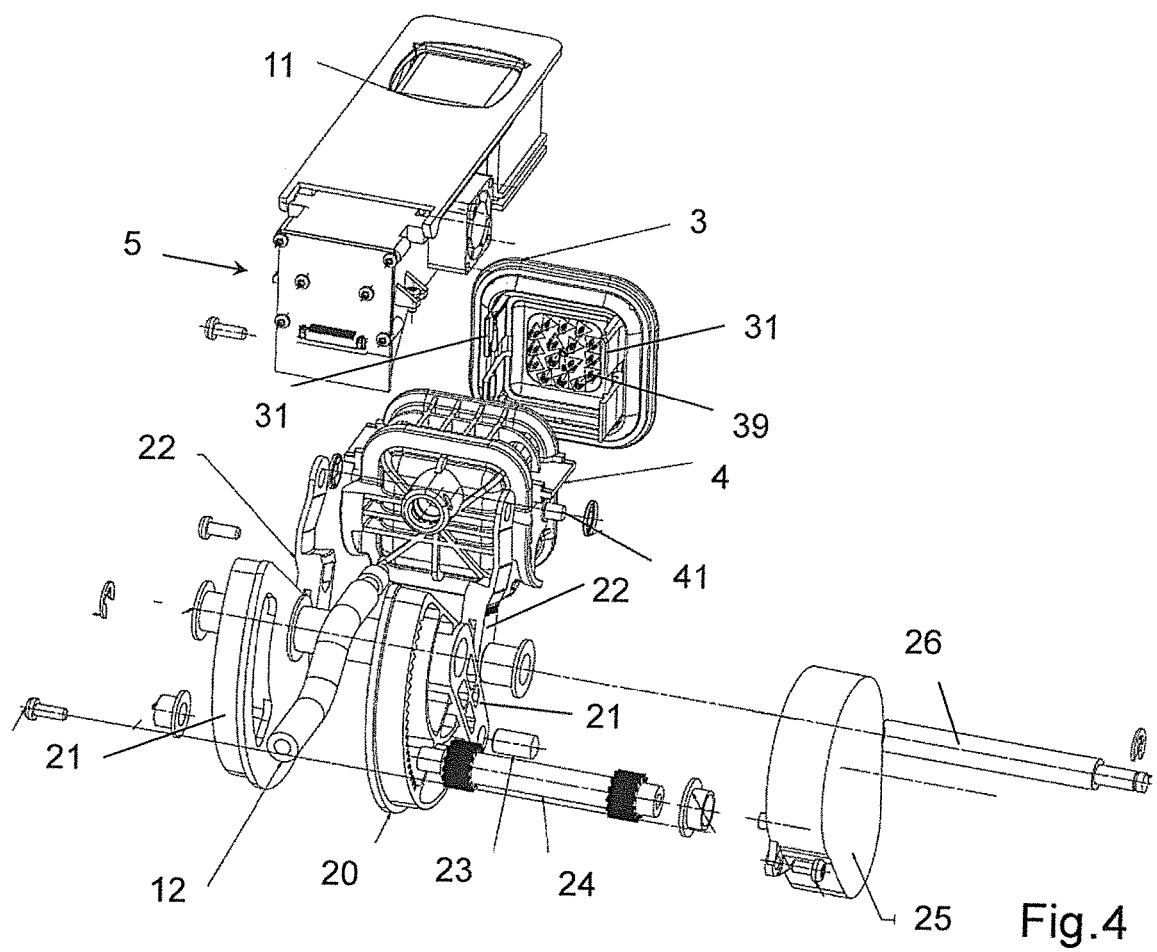
FIG. 4 is an exploded representation of elements of the brewing module according to FIG. 1-3 (without some of the housing parts)

The brewing module 1 according to FIGS. 1-3, whose elements are to be seen in FIG. 4 in an exploded representation (wherein some elements, in particular housing parts, have been omitted), includes an outer brewing module housing 2. In the represented embodiment example, this is composed of an upper housing part (capsule recognition housing) and of a lower housing part (brewing chamber unit housing). Two brewing module parts, specifically a discharge device 3 and an injector 4 and which are movable relative to one another, are guided in the brewing module housing 2.

The injector 4 includes perforation elements for piercing a capsule 10, which is able to be introduced into the brewing module via an insert opening 11 and which is at least partly filled with extraction material, for example ground coffee. The injector 4 is designed to introduce a fluid—for example hot water—through the perforation elements or past these, into the pierced capsule, wherein the water can be fed via a water feed 12 which for example can include flexible tubing.

With the embodiment example described here, the discharge device 3 also includes perforation elements, specifically extraction side piercing tips 39. These can be designed for example as is described in WO 2015/039258 or in WO 2010/118544, or have another design, and the application of principles other than piercing tips, of example with grating-like structures are also possible.

The discharge device moreover includes guide means 31, which, at both sides of the capsule, project towards the injector side, as are described for example in WO 2015/048914, the contents of which relating to the manner of functioning of these guide means as well as to the respective retrieval means of the injector being expressly referred to here.

As is known per se, for preparing a brewed drink, a capsule is placed between the discharge device 3 and the injector 4, and these are moved towards one another such that a brewing chamber encompassing the capsule is formed between these. The hot water is fed under pressure through the injector to the capsule, and the extraction product flows through the discharge device 3 via a drinks outlet 13 into a drinks vessel, which is placed therebelow for example.

The relative movement of the brewing module parts—the discharge device and the injector—in the embodiment example described here is achieved by way of the discharge device 3 being assembled in a manner in which it is fixed to the housing, whereas the injector 4 is movable along the horizontal axis. The drive of the injector is effected via a toggle lever driven in a motorised manner. A pinion shaft 24, which is in connection with an electric motor (not visible in the figures, for example covered by a drive housing 25), drives a toothed drive disc 20, which is connected to a first toggle lever arm 21 in a rotationally fixed manner, so that a pivoting movement of the drive disc 20 about its axis 26 pivots the first toggle lever arm 21 likewise about this axis. A second toggle lever arm 22 is connected at one side to the first toggle lever arm 21 via a toggle lever bolt 23 and at the other side cooperates with a guide pin 41 of the injector 4. Since the injector is mounted by the housing such that it is only linearly displaceable along the essentially horizontal axis, a pivot movement of the drive disc and of the first toggle lever arm therefore effects a stretching or sharp bending of the toggle joint formed by the toggle lever and, on account of this, a linear displacement of the injector 4.

The brewing module, above the brewing chamber unit with the discharge device 3 and injector 4 includes a capsule recognition module 5 with a camera, whose construction and manner of functioning is hereinafter dealt with in more detail.

The course of operation is described by way of FIGS. 5-9.

Figure 5:
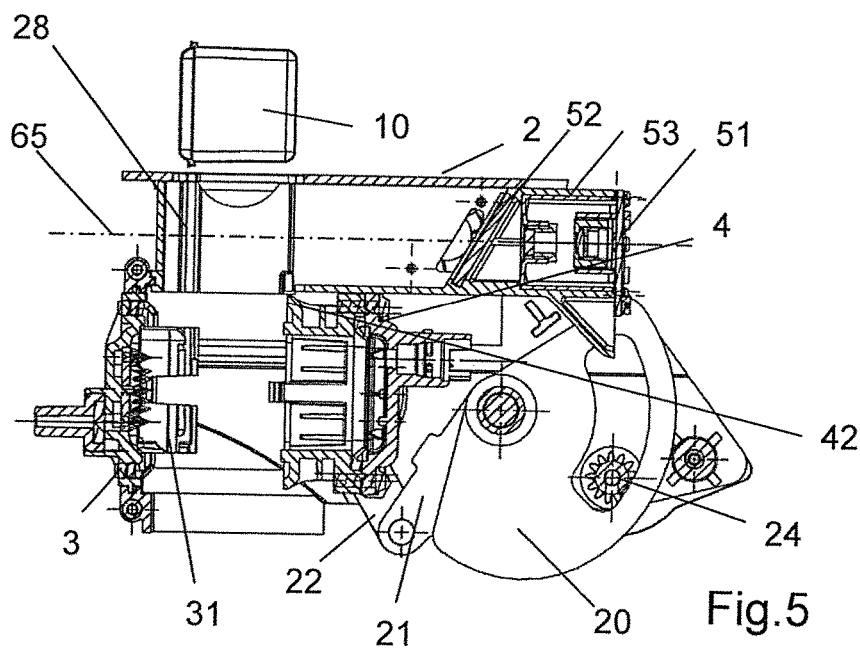
FIG. 5-9 is, in each case, a sectioned representation of the brewing module according to FIG. 1-3, during different phases of the operation.

On inserting the capsule 10, the injector 4 is located, for example, at the second position, as is represented in FIG. 5. In this position, although the brewing chamber is opened, the injector however is retracted to the injector side only to such an extent that that a rest portion 42 of the injector 4 holds back the capsule 10, which is guided in the insert opening 11 by way of a lateral guide 28, at the capsule recognition position, which is represented in FIG. 6.

Figure 6:
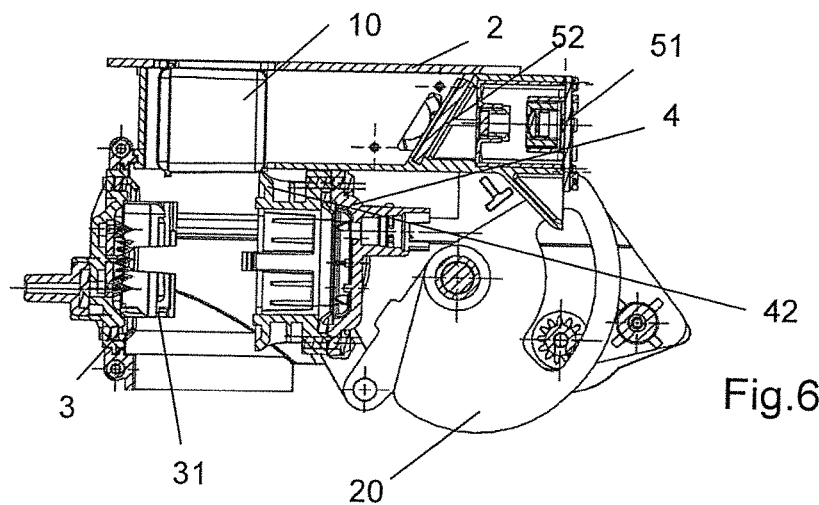

The capsule recognition, which is yet described hereafter, is carried out whilst the capsule 10 is located at this capsule recognition position according to FIG. 6, for which capsule recognition, for example, an optical feature present on the side of the capsule (capsule base) that faces the injection side is detected.

Figure 7:
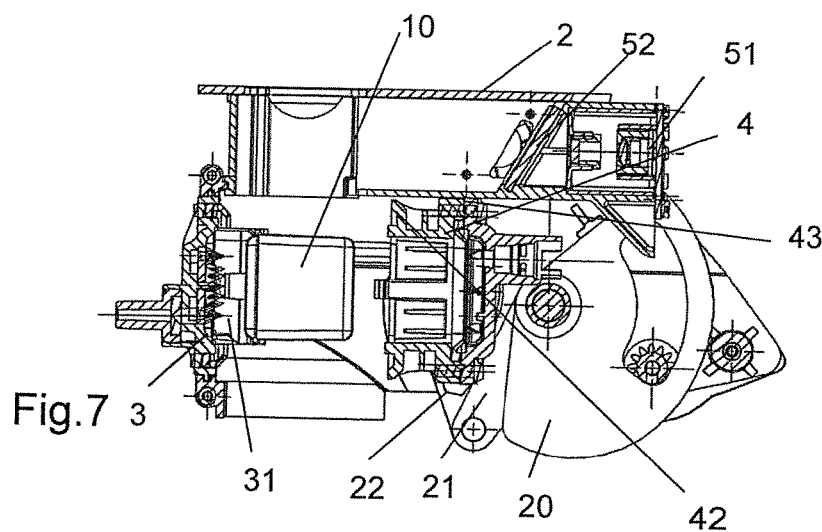
Figure 10:
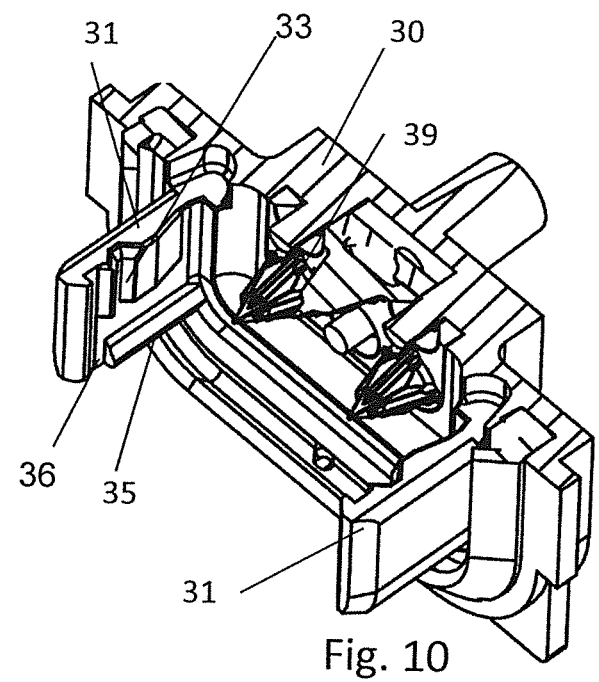
FIG. 10 is a detail of a possible embodiment of a discharge device.

As the case may be and in a manner depending on the result of the capsule recognition, the injector 4 is subsequently moved even further towards the injection side into the third position, which is illustrated in FIG. 7. The rest portion is displaced away from the capsule by way of this, and the capsule can drop downwards. It is stopped at the height of the brewing position by way of a rest of the lateral guide means 31. This can be effected, for example, by way of a rest 35, on which a collar and or another portion of the capsule comes to lie, when this capsule drops downwards, guided with the collar in a (first) track 33 connecting to the lateral guide 28. This principle is illustrated in FIG. 10 and is described in detail in WO 2015/048914.

Figure 8:
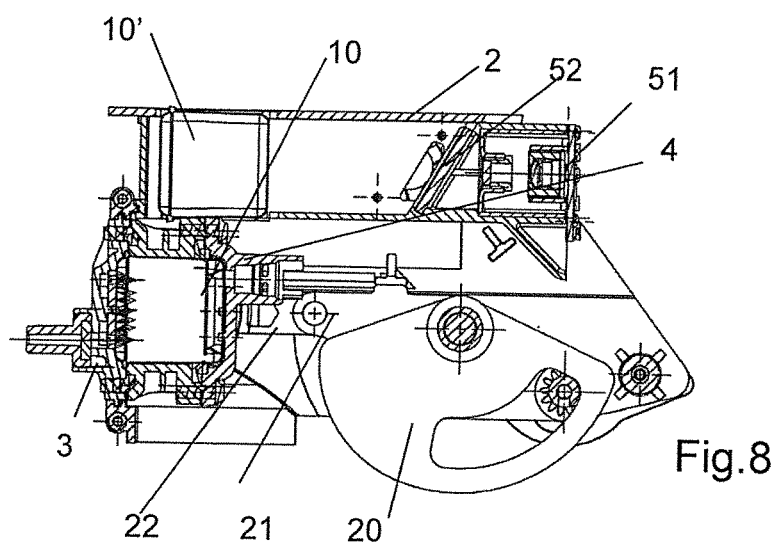

The brewing chamber is subsequently closed after activation by the user or automatically, for which the injector is moved from the third into the first position. FIG. 8 shows the brewing module with the injector in the first position. The capsule 10 is pierced at both sides, and the brewing process takes place, for example by way of hot water being led under pressure into the capsule. On closing the brewing chamber, for example, the capsule collar is also displaced out of the mentioned first track 33.

Optionally, a further capsule 10' can already be inserted during the brewing process, and this further capsule then lies on the already mentioned rest portion 42 or on a further rest portion 43 and remains in the capsule recognition position. The recognition of the second capsule 10' can therefore already be effected during the brewing process of the first capsule 10.

Figure 9:
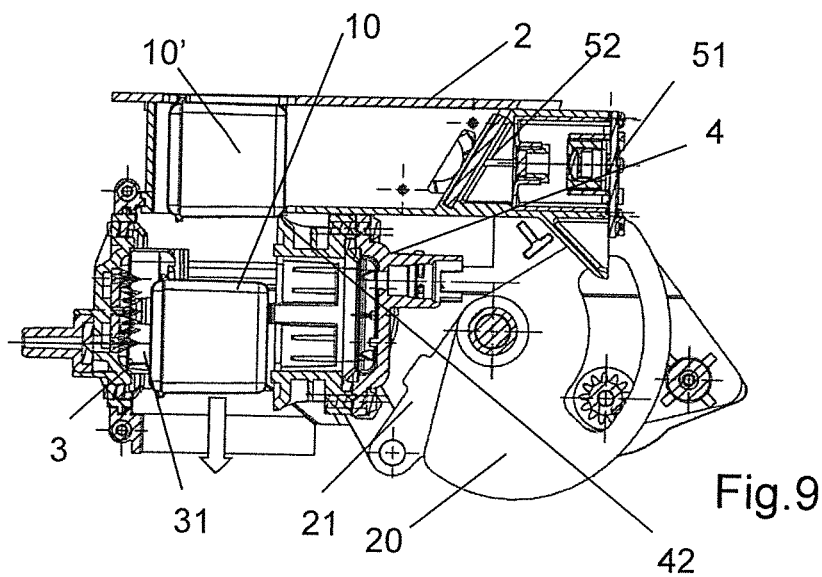

The injector is moved back into the second position after completion of the brewing process. The spent capsule 10 can drop downwards into a capsule container (FIG. 9).

The fact that the spent capsule can drop downwards can be accomplished by way of the capsule position after the brewing process being displaced with respect to the position after the insertion, such that it no longer lies on the rest 35, but the collar, for example, is guided in a second track 36, as is likewise described in WO 2015/048914. Thereby, the option of the second track 36 running further to the injector side in comparison to the first track 33 and vice versa is also given.

As an alternative to this procedure according to WO 2015/048914, one can also envisage, for example, the lateral guide means being pivoted outwards after completion of the brewing process, or holding or guide means being moved relative to the capsule some other way, on closing the brewing chamber and/or on opening it after the brewing process.

Instead of a movement from the first into the second position, a movement directly into the third position can be effected, if a capsule recognition process of a second capsule, which takes place during a brewing procedure, is already completed.

Figure 12:
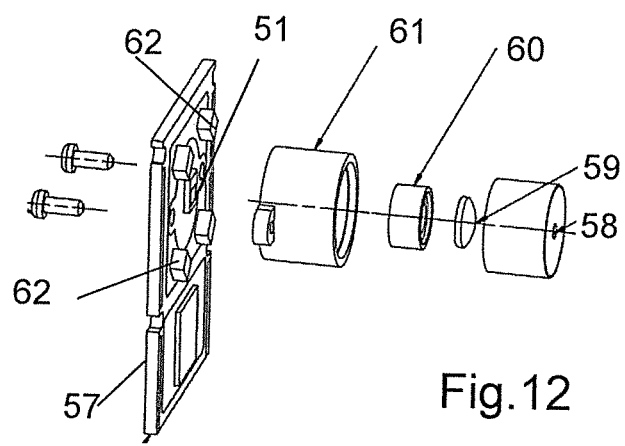
FIG. 12 is an exploded representation of a camera unit of the capsule recognition module.
Figure 11:
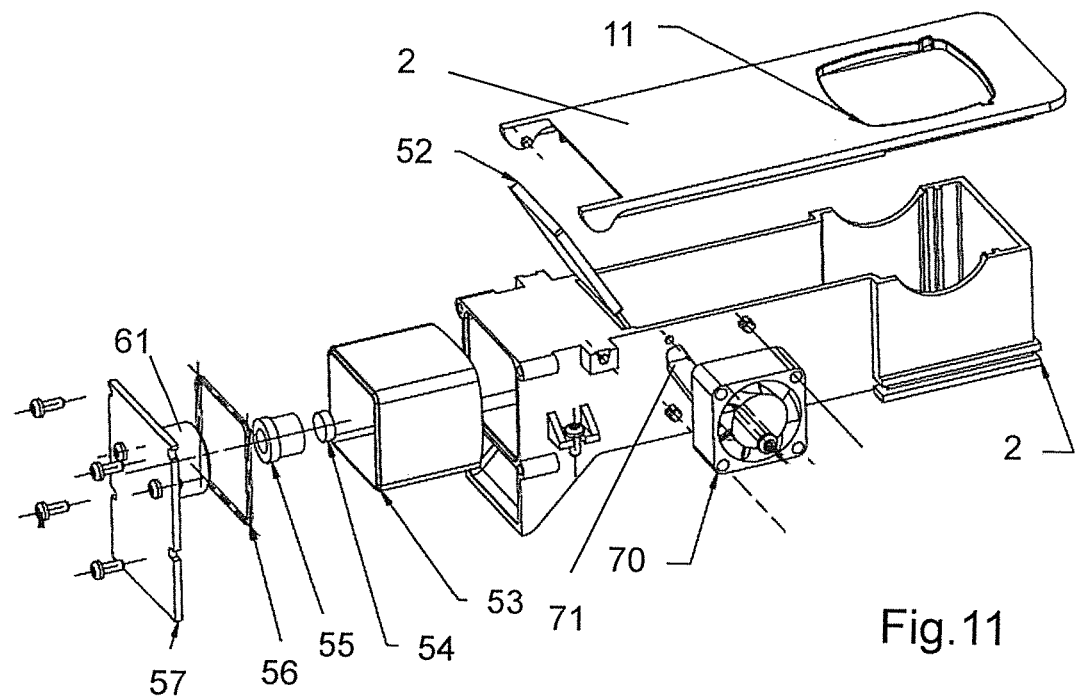
FIG. 11 is an exploded representation of the elements of the brewing module with the capsules recognition module, which are present at the upper side.

FIG. 11 shows the capsule recognition module including the respective parts of the housing 2, in an exploded view. FIG. 12 shows parts of the camera, as well as of the illumination means of the capsule recognition module, likewise in an exploded representation. Some of the respective elements are also visible in FIG. 5.

After the brewing procedure, water vapour also gets into the region above the brewing position and into the environment of the capsule recognition position. The capsule recognition module apart from the camera unit therefore also includes a capsule recognition window 52, which separates the camera and, as the case may be other optical or electronic components, from the region, into which water vapour can get.

Amongst other things, several LEDs 62 as light sources are arranged on a circuit board 57, and during the capsule recognition process produce light, which is thrown upon the capsule via a diffuser 53 (cf. also FIG. 5) and a capsule recognition window 52. A suitable, optically readable feature, for example a barcode, a 2D matrix code (for example QR code or Aztec code), another defined code, a pictogram (icon) and/or also a certain colouring, is present on the capsule.

The side of the capsule that is illuminated by the light sources is detected by the camera and is evaluated in the camera or by way of a separate module (not represented), which, for example, is likewise present in the coffee machine.

The light, which is reflected from the illuminated capsule for this purpose, gets through the capsule recognition window 52 and a diffuser window 54 in the diffuser 53 (the diffuser effect exists only around the diffuser window 54—the diffuser widow 54 itself is transparent) to the camera which includes an aperture 58, at least one lens 59 as well as the camera sensor 51, for example with a CCD or CMOS sensor array, which is likewise present on the circuit board 57.

The diffuser window 54 here is held by a diffuser window holder 55, and the lens 59 is guided in a lens fixation 60, which for its part is held by a lens holder 61 assembled on the circuit board 57. The mechanical details of the camera optics and the design of the diffuser, however, can also be selected differently without further ado.

An optional sealing frame 56, which, together with the diffuser itself, ensures an additional protection of the camera electronics is present between the diffuser 53 and the circuit board 57.

With regard to the capsule recognition position, a fan is located in front of the capsule recognition window 52 and during the capsule recognition procedure and/or before this produces an airflow in front of the capsule recognition window, by way of it sucking air from outside the coffee machine and blowing it through a slot 71 in the housing 2 to in front of the capsule recognition window 52.

A further feature of the capsule recognition window, for example, is likewise represented in FIG. 11. The capsule recognition window 2 is arranged at a non-right angle to the axis 65 between the capsule recognition position and the camera sensor 51. By way of this, reflections of the light sources are efficiently prevented from being able to superimpose on the image of the capsule on the camera sensor and from being able to adulterate the evaluation. The angle of the capsule recognition window plane to the perpendicular to the axis 65 'capsule recognition position—camera sensor' (defined as the axis going in each case through the middle of the camera sensor surface and the capsule located at the capsule recognition position, respectively, see FIG. 5; the axis 65 can coincide with the optical axis of the camera) for example is at least 10°, in particular at least 15°

Figure 13:
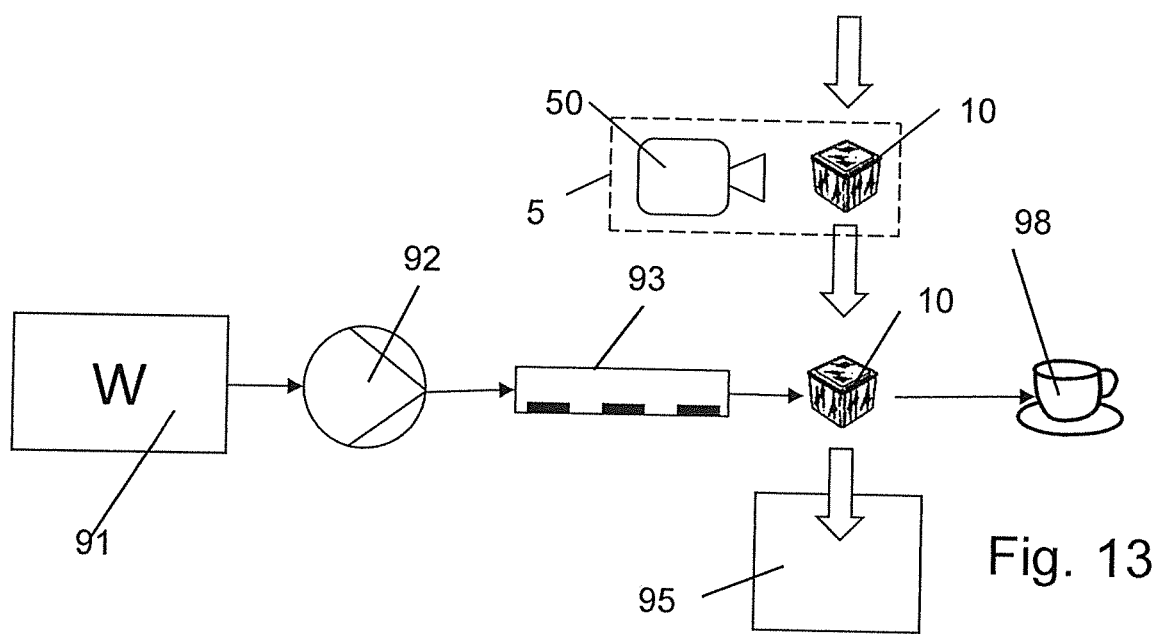
FIG. 13 is a schematic diagram of a drinks preparation machine.

A machine according to the invention, for preparing a brewed drink from a portion capsule, here specifically a coffee machine, with a brewing module, is represented schematically in FIG. 13. Apart from the brewing module, it includes a water tank 91, a pump 92 for feeding brewing water to the injector 4 and a water heating device 93 (for example continuous-flow heater). The capsule recognition module 5 with the camera 50 in particular is located above the brewing chamber. After the capsule recognition process, an inserted capsule can be transported further, downwards by way of the effect of gravity as has been described above. Moreover, a capsule container 95 into which the capsules 1 drop or are transported during the brewing process is arranged below the brewing module. The reference numeral 98 indicates a coffee cup.

LIST OF REFERENCE NUMERALS 1 brewing module
2 housing
3 discharge device
4 injector
5 capsule recognition module
10 capsule
10' second capsule
11 insert opening
12 water feed
13 drinks outlet
20 drive disc
21 first toggle lever arm
22 second toggle lever arm
23 toggle lever bolt
24 pinion shaft
25 drive housing
26 axis
28 guide
31 guide means
33 first track
35 rest
36 second track
39 extraction-side piercing tips
41 guide pins
42 rest portion
43 further rest portion
50 camera
51 camera sensor
52 capsule recognition window
53 diffuser
54 diffuser window
55 diffuser window holder
56 sealing frame
57 circuit board
58 aperture
59 lens
60 lens fixation
61 lens holder
62 LED
65 axis
70 fan
71 slot
91 water tank
92 pump
93 water heater device
95 capsule container
98 coffee cup

The invention claimed is:

1. A capsule recognition module for a brewing module for preparing a brewed beverage from a portion capsule, comprising:
   an optical sensor that comprises a camera, said optical sensor being adapted to detect optical characteristics of the capsule located at a capsule recognition position,
   a capsule recognition window of a transparent material, between the capsule recognition position and the camera,
   a fan for producing an airflow at the side of the capsule recognition window that is towards the capsule recognition position, and
   at least one light source for the illumination of the capsule at the capsule recognition position, wherein the light source is arranged at the side of the capsule recognition window that is towards the optical sensor.

2. The capsule recognition module according to claim 1, comprising a diffuser for light produced by the light source.

3. A brewing module for preparing a brewed beverage from a portion capsule, comprising:
   a housing, which comprises a capsule insert opening, through which the capsule can be inserted;
   a first brewing module part and a second brewing module part, which is movable relative to this, wherein a brewing chamber can be formed by the first and the second brewing module part, said brewing chamber at least partly surrounding the capsule located in a brewing position during the brewing procedure, wherein the brewing module is designed to brew a brewed beverage by way of the introduction of a brewing fluid into the capsule and to discharge this beverage out of the capsule; and
   the capsule recognition module according to claim 1.

4. The brewing module according to claim 3, wherein the capsule recognition module is arranged such that the capsule recognition position is vertically above the brewing position.

5. The brewing module according to claim 4,
   wherein the first and the second brewing module parts are movable relative to one another, between three different, defined positions,
   wherein the brewing chamber is formed in the first position,
   wherein the capsule located in the brewing chamber drops downwards into a capsule container under the effect of gravity after a movement from the first into the second position, wherein however in the second position the brewing module parts have the effect that a capsule which is inserted through the capsule insert opening is held vertically above a height of the brewing position, at the capsule recognition position,
   wherein in the third position, a capsule located at the capsule recognition position can drop downwards from this, essentially down to the height of the brewing position,
   and wherein the second position is between the first position and the third position.

6. The brewing module according to claim 3, wherein the movability of the second brewing module part relative to the first brewing module part permits a purely linear relative movement.

7. A beverage preparation machine, comprising a water feed, a pump and a water heater, as well as the capsule recognition module according to claim 1 or the brewing module according to claim 3.

8. A capsule recognition module for a brewing module for preparing a brewed beverage from a portion capsule, comprising:
- an optical sensor that comprises a camera, said optical sensor being adapted to detect optical characteristics of the capsule located at a capsule recognition position,
- a capsule recognition window of a transparent material, between the capsule recognition position and the camera, and
- a fan for producing an airflow at the side of the capsule recognition window that is towards the capsule recognition position,
- wherein the capsule recognition window is arranged at a non-right angle to an axis between the capsule recognition position and the optical sensor.

* * * * *